May 19, 1970  R. H. DOUGLASS, JR  3,512,408
BATHOMETER
Filed Dec. 3, 1967
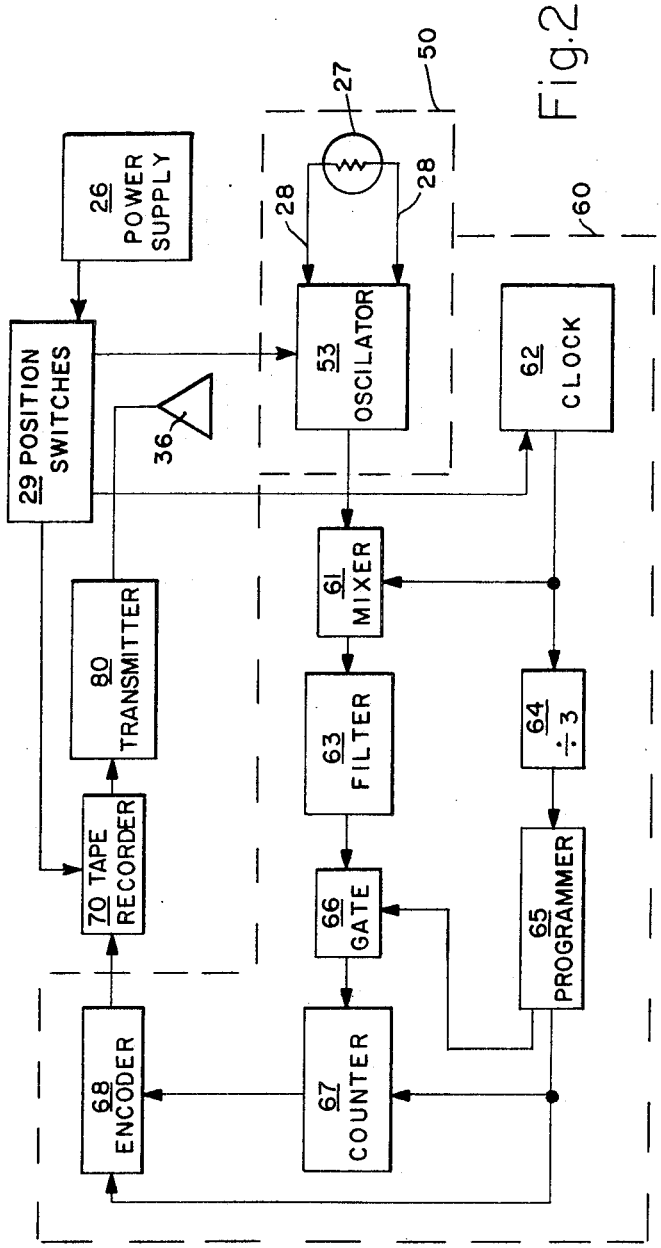
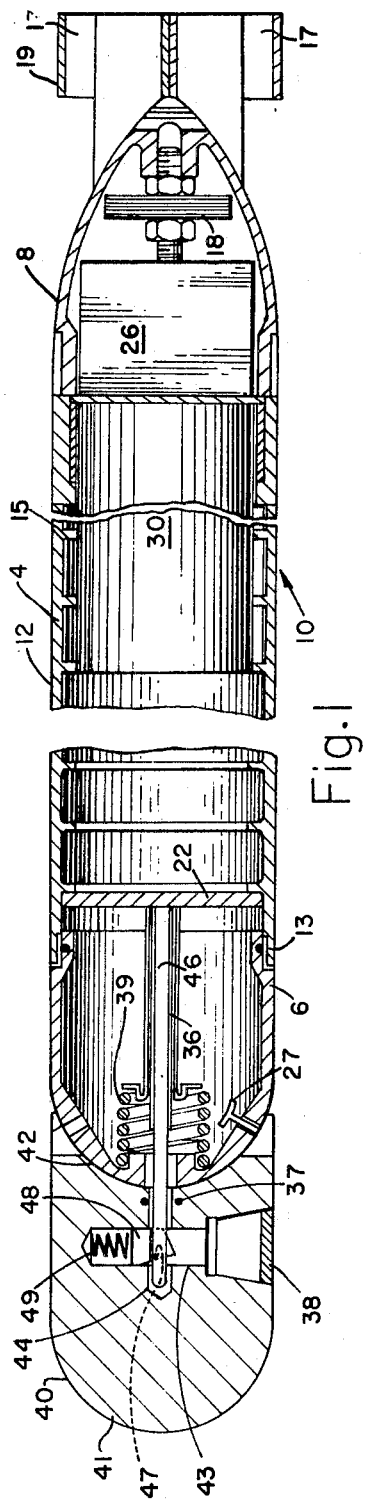
INVENTOR
Robert H. Douglass, Jr.

United States Patent Office 3,512,408
Patented May 19, 1970

3,512,408
BATHOMETER
Robert H. Douglass, Jr., Manhattan Beach, Calif., assignor to TRW Inc., Redondo Beach, Calif., a corporation of Ohio
Filed Dec. 8, 1967, Ser. No. 689,013
Int. Cl. G01k 1/02
U.S. Cl. 73—170               6 Claims

ABSTRACT OF THE DISCLOSURE

A bathometer for determining ocean water temperature at programmed intervals of vertical distance from preselected ocean depth to the ocean surface, and for recording and subsequent transmission of the data to a remote receiving station. A housing and ballast are submerged to the preselected ocean depth and the ballast jettisoned. The ballast-free housing executes a turn around and ascends to the ocean surface while simultaneously measuring and recording ocean water temperature. Upon reaching the ocean surface, an antenna is deployed and the recorded data is transmitted to a remote station.

BACKGROUND OF THE INVENTION

The background of the invention is set forth in two parts:

Field of the invention

The field of art to which the invention pertains is oceanography, and, more particularly, to a device for measuring, recording and transmitting ocean water characteristics, such as temperature and pressure, measured in a vertical gradient.

Description of the prior art

Knowledge of ocean water characteristics is desirable for many reasons, including the ascertainment of effects of temperature gradients on sonar signals. Systems for determining ocean water characteristics have heretofore been devised; however, each such system has one or more limitations which are alleviated by the present invention.

Some prior art systems employ an underwater signal device and a remotely located sonobuoy for detecting and relaying these signals to a receiving station as typified by the Richard patent, U.S. Pat. No. 3,148,618, issued Sept. 15, 1964, and the Coop patent, U.S. Pat. No. 3,098,993, issued July 23, 1963.

Other systems, as disclosed by Tatanall, et al., No. 3,093, 808, issued July 11, 1963, utilize a surface unit and an underwater signal device lowered into the ocean depth by a cable. Such systems introduce velocity error into the recorded data due to the payout of the trailing cable.

Still another disadvantage of prior art bathometer systems is error in collected data inherent in the taking of data samples during the descent of the bathometer. Such bathometers may be carried to the site of deployment into the ocean by surface ships or aircraft; consequently, a bathometer may be subjected to an environmental temperature range of −60° F. to 100° F. or greater. Upon deployment a finite time is required for the bathometer and associated electronic systems to stabilize in temperature. Prior to temperature stabilization error may be introduced into the measurement system rendering a portion of the collected data unreliable. Another disadvantage of descending data collection is present when the bathometer is deployed from an aircraft. The velocity of the bathometer upon impact with the ocean's surface is dependent upon the altitude from which the bathometer is dropped, and the bathometer must decelerate to its optimum descent velocity for data measurement. A drop from 20,000 feet may require as much as 100 feet of ocean depth to decelerate the bathometer to its optimum descent velocity. Data correction is thus required for each condition of drop altitude in order to compensate for the deceleration of the bathometer. The present invention provides a system for collecting data samples during the ascent of the vehicle. Since the vehicle has a known and repeatable descent velocity and the acceleration at the start of ascent may be calculated, the ascent of the vehicle may be commenced at a predetermined depth below the depth at which data is of interest. By the present invention no correction need be applied to the data collected.

SUMMARY OF THE INVENTION

In view of the foregoing factors and conditions characteristics of bathometers, it is a primary object of the present invention to provide a new and useful bathometer system not subject to the disadvantages enumerated above and having a housing for various electronic equipment and having predetermined centers of buoyancy and mass, a jettisonable ballast of sufficient weight to submerge the housing to a predetermined depth, one or more sensors for determining the desired ocean characteristics, data gathering apparatus for recording the ocean characteristics during the ascent of the housing, and transmitting apparatus for relaying the recorded data to a distant point after the housing reaches the ocean surface.

Another object of the invention is to provide a self-contained bathometer system capable of sensing, recording, and transmitting ocean characteristics.

Still another object of the invention is to provide a bathometer which samples ocean characteristics while traversing a course from a preselected ocean depth to the surface thereof.

Yet another object of the invention is to provide a bathometer which eliminates the need for a payout cable intermediate the signal generating portion and the data relaying portion.

According to the present invention, a new and useful bathometer system is provided having means for positioning the bathometer at a preselected ocean depth which includes a ballast portion and ballast jettison means having a burst diaphragm sensitive to ocean water pressure. Further, a new and useful bathometer system is provided having means for collecting data during ascent of the housing which includes positioning of the centers of buoyancy and mass of the housing so as to cause the ballast-free housing to execute a turnabout at a preselected depth for ascent to the surface, an ocean water characteristic sensor, and data recording means.

BRIEF DESCRIPTION OF THE DRAWING

FIG. 1 is a cross-sectional elevational view of the bathometer.

FIG. 2 is a block diagram of the principal components of the bathometer electronic system.

DESCRIPTION OF THE PREFERRED EMBODIMENT

Referring again to the drawing, and more particularly to FIG. 1, a bathometer system 10 includes a housing 12, a jettisonable ballast portion 40, an aft ballast 18, and an electronic package 30, which includes a power supply 26, a thermistor 27, and a deployable antenna 36.

The housing 12 may be formed of any material having sufficient structural integrity for the maximum anticipated ocean depth. In the practice of the invention, applicant prefers a cylindrical aluminum shell 4 with integrally formed ring-stiffeners 15. The forward end 13 of shell 4 is sealed with an aluminum bulkhead 22, bonded in place with epoxy. Housing 12 is completed by an aluminum forward cap 6 and an aluminum aft cap 8. Aft cap 8 is threadably engaged to shell 4 and incorporates four equally spaced stabilizer fins 17 and a cylindrical fin 19. Aft ballast 18 retained within aft cap 8 may be varied in amount to adjust the center of gravity of the bathometer assembly 10. Forward cap 6 is externally contoured for hydrodynamic cleanness when removal of jettisonable ballast 40 is effected.

Jettisonable ballast 40 has a hydrodynamically shaped forward end 41 and a rearward end 42 shaped to register with forward cap 6. Jettisonable ballast 40 may be of any suitable material such as iron. Formed in jettisonable ballast 40 are bore 43 and bore 44.

Means for jettisoning jettisonable ballast 40 is provided. Post 46 is affixed to bulkhead 22 of housing 12 and extends forwardly through forward cap 6 for receivable slidable engagement in bore 44 of jettisonable ballast 40. The free end of post 46 is shaped to form a slot 47. Piston 48 is slidably received in bore 43 of jettisonable ballast 40 and is biased by spring 49 into engagement with the slot 47 of post 46. Thus, the piston 48 serves as a detent member. Seal 37 is sealably mounted in bore 44 of jettisonable ballast 40 for preventing ingress of sea water.

Diaphragm 38 seals the mouth of bore 43 and is selected to burst under ocean pressure corresponding to a preselected ocean depth. Rupturing of burst diaphragm 38 permits ingress of ocean water which acts upon piston 48 to move piston 48 against spring 49 overcoming the spring forces of said spring 49. Movement of piston 48 disengages piston 48 from slot 47 of post 46 releasing jettisonable ballast 40 from engagement with housing 12.

In accordance with the practice of the invention, applicant has successfully tested a bathometer having a length of approximately 36 inches, a diameter of 3.502, and weighing 19.4 lbs. in ocean depth in excess of 2000 feet. The center of gravity and buoyancy of the bathometer 10 was arranged to impart an optimum descent velocity of 20 feet per second.

When the bathometer reaches a preselected depth, burst diaphragm 38 ruptures allowing water pressure to act upon piston 48. Latching portion 47 releases jettisonable ballast 40 which falls away. Loss of jettisonable ballast 40 causes the center of gravity to shift aft of the center of buoyancy and the ballast-free bathometer rotates 180° assuming a position with the forward cap 6 directed upwardly. Optimum desired ascent rate of applicant's experimental bathometer was 10 feet per second.

The rotation of the bathometer actuates position switches 29 permitting operation of electronics package 30 for recording readings from the thermistor probe 27.

After release of ballast 40, hydrostatic pressure holds forward cap 6 to housing 12 overcoming the spring force of spring 39 and of antenna assembly 36. Within six inches of surfacing, spring forces of spring 39 and of antenna assembly 36 overcome the effect of hydrostatic pressure and the weight of forward cap 6 permitting forward cap 6 to be ejected and antenna 36 to be extended. Antenna assembly 36 is of the telescope type mounted over post 46 and is secured to bulkhead 22 of housing 12. Antenna housing 36 is also of the spring loaded variety so that after ejection of forward cap 6 by spring 39, the antenna 36 extends outwardly into an operative position. Ejection of forward cap 6 disconnects thermistor lead 28 and actuates microswitches (not shown) mounted on bulkhead 22 to actuate transmitter 80 and to change the tape recorder 70 from the record to the playback mode.

Turning now to FIG. 2, the block diagram of the electronic system is shown and the diagram is divided into segments by a broken line grouping the various components by their function.

The electronic package 30 consists of a data gathering subsystem 50 that detects changes in ocean water temperature as the bathometer ascends to the surface, a signal conditioner subsystem 60 which processes the data into their digital work forms, a tape recorder 70 through which the data are recorded during ascent and through which the data are played back upon surfacing, a transmitter 80 for relaying the played-back data to a remote station, an antenna 36, and a battery pack 26 which powers the entire system.

As has been described, ballast release initiates the turnabout which actuates the position switches 29. The position switches 29 are closed, applying power from the power pack 26 to the data gathering subsystem 50, the signal conditioner subsystem 60 and to the drive motor and recording circuits of tape recorder 70. Within the data gathering subsystem 50, thermistor probe 27 senses changes in ocean water temperature about some nominal temperature by changing its resistance as a function of temperature. The change in thermister probe resistance in turn modulates a resistance control oscillator 53, producing a shifting frequency about some nominal frequency. The output from the resistance control oscillator 53 is sent to a balanced mixer 61 in the signal conditioner subsystem 60. There it is mixed with the output signal from a system clock oscillator 62. The output from the balanced mixer 61, consisting of upper and lower side band frequency terms, is filtered by a low pass filter 63.

Clock oscillator 62 is counted down through the divide-by-3 network 64 and sequential programmer 65 providing various clock signals to the rest of the system. One of the outputs from the sequence programmer 65 is provided as an input to sample gate 66 directing the gate to allow the transfer of signals from the output of filter 63 to the counter 67. Sample gate 66 is alternately on for one-forth of a second and off for one-fourth of a second, therefore, output from sample gate 66 consists of a pulse train alternately at a definite frequency for one-fourth of a second and zero for the next one-fourth of a second. During any one-half second interval for which the sample gate 66 is alternately on and then off, the output from sample gate 66 consists of frequency components. The output from the sample gate 66 is counted by a nine-stage, binary shift register/counter 67. During the count phase (time when the sample gate is on), the shift register/counter 67 shifts out, in a serial manner, the binary count that was indicative of the total number of pulses out of sample gate 66 during the previous one-fourth of a second interval. The result is a data sample every one-half second.

The binary count being shifted out of the shift register/counter 67 can be directly related to change in temperature about some nominal temperature. Therefore, a one-two-one correspondence exists between a binary count out of the shift register/counter 67 and the ocean water temperature that thermistor probe 27 senses. The output from the shift register/counter 67 consists of a non-return-to-zero binary pulse train, nine bits in length, and directly related to the temperature which the thermistor probe 27 senses. It is then passed to a Manchester encoder 68 which combines it with suitable clock synchronization pulses to produce an output containing both data and synchronization information. Manchester encoding is also known as bi-phase or split-phase modulation. The output from the Manchester encoder 68 is recorded by the tape recorder 70 during the ascent-record phase. The data are recorded at one-half second intervals which at ten feet per second ascent rate represents a data sample every five feet of ascent.

Upon surfacing, antenna 36 extends, the thermistor circuit is opened, power is applied to the transmitter 80 and the tape recorder 70 is switched to playback. Tape recorder 70 is a continuous tape loop, unidirectional drive device. It does not rewind for data playback. During the playback phase, the tape head driver is disabled and the signals detected by the head are amplified and used to set and reset the integrated circuit, resulting in regenerated Manchester encoded non-return-to-zero data. The output from the tape recorder 70 is provided as a digital modulation input to transmitter 80. Transmitter 80 is crystal controlled, frequency-shift-key modulated.

Antenna 36 is a deployable, quarter-wave monopole above an infinite ground formed by the water surrounding the floating bathometer. Power supply 26 for the electronic subsystem is a battery pack made up of nine mercury cells in series.

What is claimed is:

1. An apparatus for measuring and recording ocean water characteristics comprising:
   (a) a housing;
   (b) a ballast;
   (c) connecting means for releasably connecting said ballast to said housing, said connecting means being operably connected to said housing and said ballast;
   (d) jettison means for releasing said connecting means in response to hydrostatic pressure thereby jettisoning said ballast, said jettison means being operably connected to said connecting means;
   (e) said housing having a preselected buoyancy value and center of gravity permissive of descending said housing and said ballast to a predetermined ocean depth and permissive of said housing ascending to the ocean surface at a constant ascent rate after said ballast is jettisoned;
   (f) data gathering means for sensing and recording an ocean water characteristic, said data gathering means being mounted in said housing and in operable relationship with the ocean water;
   (g) sensing means for sensing the start of said ascent of said housing, said sensing means mounted in said housing; and
   (h) activating means for activating said data gathering means, said activating means being operably connected to said data gathering means and said sensing means whereby an ocean water parameter is sensed, and recorded during the ascent of said housing from a preselected ocean depth to the ocean surface.

2. The apparatus for measuring and recording ocean water characteristics of claim 1, including:
   (a) transmitting means for relaying the gathered data to a remote receiving station, said transmitting means being mounted in said housing and being operably connected to said data gathering means; and
   (b) detection means responsive to the ocean surface for deactivating said data gathering means and for activating said transmitting means following the ascent of said housing to the surface of the ocean, said detection means being mounted on said housing and operably connected to said data gathering means and to said transmitting means.

3. An apparatus for measuring and recording an ocean water parameter comprising:
   (a) an elongated housing;
   (b) a ballast;
   (c) jettisoning means for releasably connecting said ballast to the forward end of said housing and for jettisoning said ballast in response to hydrostatic pressure, said jettisoning means being operably connected to said forward end of said housing and to said ballast;
   (d) said housing having preselected centers of buoyancy and mass permissive of descending said housing and said ballast to a predetermined ocean depth and permissive of said housing ascending to the ocean surface at a constant ascent rate after said jettisonable ballast is jettisoned;
   (e) data gathering means for sensing and recording an ocean water parameter, said data gathering means being mounted in said housing and in operable relationship with the water; and
   (f) activating means for initiating operation of said gathering means responsive to the start of said ascent of said housing, said activating means being in operable relationship with said data gathering means.

4. The apparatus for measuring and recording an ocean water parameter of claim 3 wherein the center of buoyancy and center of mass of said housing and said ballast in combination orientates the forward end of said elongated housing in a downwardly direction during descent of said housing and said ballast and, upon jettisoning of said ballast, orientates the forward end of said housing in an upwardly direction during ascent of said housing.

5. The apparatus for measuring and recording an ocean water parameter of claim 3 wherein said ballast has formed therein a first passageway concentric with the axis of said ballast and extending through the surface of said ballast adjacent said housing, and a second passageway normal to said first passageway and intersecting same, said second passageway entering through one surface of said ballast and being shaped to receive a piston therein, and wherein said jettison means comprises:
   (a) a post axially mounted on said housing and extending axially forwardly therefrom and slidably engaged in said first passageway of said ballast, the forward end of said post being shaped to form a piston engaging portion;
   (b) a piston slidably mounted in said second passageway of said ballast and shaped for locking engagement with said piston engaging portion of said post;
   (c) bias means for urging said piston toward the mouth of said second passageway, said bias means being connected to said piston and to said ballast;
   (d) sealing means for preventing ingress of ocean water into the mouth of said first passageway, said sealing means being mounted on said ballast and engaging said post; and
   (e) a diaphragm selected to burst at a predetermined pressure sealably mounted over the mouth of said secondary passageway,
whereby ocean water pressure at a preselected depth will rupture said diaphragm allowing water pressure to act against said piston releasing said piston from engagement with said piston engaging portion of said post thereby allowing said ballast to be jettisoned from said housing.

6. A method of collecting ocean water characteristics comprising the steps of:
   (a) submerging a ballasted bathometer to a preselected ocean depth;
   (b) jettisoning the ballast from the bathometer to render the bathometer buoyant;
   (c) simultaneously sensing and recording an ocean water characteristic during the ascent of the bathometer;
   (d) terminating the sensing and recording of said ocean water characteristic responsive to the bathometer reaching the ocean surface; and
   (e) transmitting the recorded data to a receiving station.

References Cited

UNITED STATES PATENTS

| | | | |
|---|---|---|---|
| 56,436 | 7/1866 | Morse | 9—8 |
| 3,098,993 | 7/1963 | Coop | 340—2 |
| 3,221,556 | 12/1965 | Campbell | 73—170 |

S. CLEMENT SWISHER, Primary Examiner

D. E. CORR, Assistant Examiner

U.S. Cl. X.R.

73—343, 362